United States Patent [19]

Valette

[11] Patent Number: 5,388,111
[45] Date of Patent: Feb. 7, 1995

[54] PROCESS FOR THE PRODUCTION OF AN ACOUSTOOPTICAL CELL FOR A SWITCHED LASER, THE CELL OBTAINED, PROCESS FOR THE COLLECTIVE PRODUCTION OF SWITCHED MICROCHIP LASERS AND MICROCHIP LASERS OBTAINED

[75] Inventor: Serge Valette, Grenoble, France

[73] Assignee: Commissariat A l'Energie Atomique, Paris, France

[21] Appl. No.: 227,283

[22] Filed: Apr. 13, 1994

[30] Foreign Application Priority Data

Apr. 14, 1993 [FR] France .................. 93 04375

[51] Int. Cl.⁶ .............................. H01S 3/11
[52] U.S. Cl. ................................ 372/13
[58] Field of Search .......................... 372/13

[56] References Cited

U.S. PATENT DOCUMENTS 5,153,771  10/1992  Link et al. ..................... 372/13

FOREIGN PATENT DOCUMENTS 0272912  6/1988  European Pat. Off. .
0523861  1/1993  European Pat. Off. .

OTHER PUBLICATIONS

Zayhowski, J. J., et al., "Diode-Pumped Microchip Lasers Electro-Optically Q-Switched at High Pulse Repetition Rates", *Optics Letters*, vol. 17, No. 17, pp. 1201–1203, Sep. 1992.

Plaessmann, H., et al., "Reducing Pulse Duration in Diode Pumped Q-Switched Solid-State Lasers", *IEEE Photonics Technology Letters*, vol. 3, No. 10, pp. 885–887, Oct. 1991.

Sriram, S., et al., "Novel V-Groove Structures on Silicon", *Applied Optics*, vol. 24, No. 12, pp. 1784–1787, Jun. 1985.

*Primary Examiner*—Léon Scott, Jr.
*Attorney, Agent, or Firm*—Burns, Doane, Swecker & Mathis

[57] ABSTRACT

Process for the production of an acoustooptical cell for a switched laser, the cell obtained, process for the production of microchip lasers having acoustooptical switching means and the microchip lasers obtained. A wafer is etched in order to bring about the appearance of a particular cristallographic plane (40) and on said plane are deposited piezoelectric means (86) able to create an acoustic wave. This wave makes it possible to switch the laser.

20 Claims, 10 Drawing Sheets

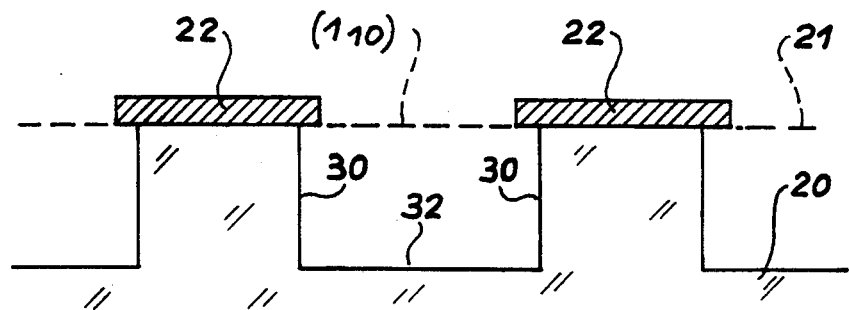
FIG. 4
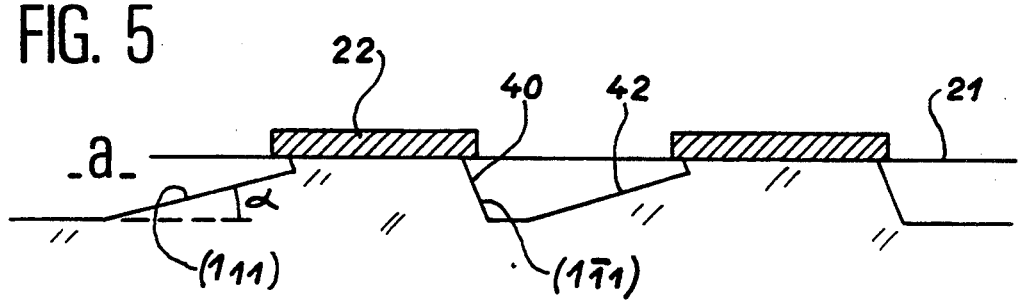
FIG. 5
_a_
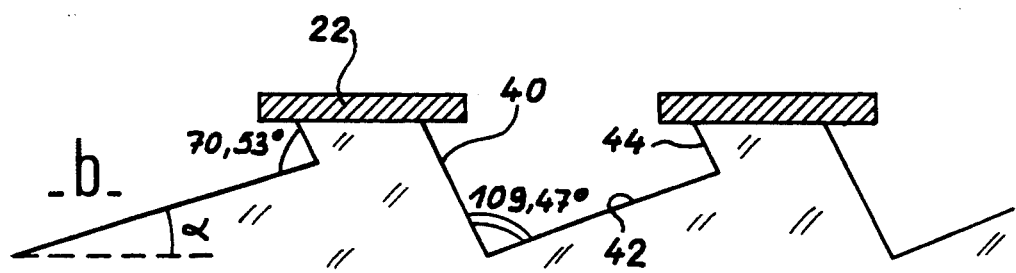
_b_
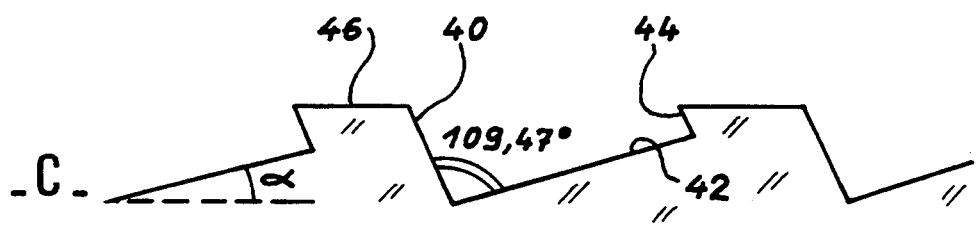
_c_
_d_

FIG. 9
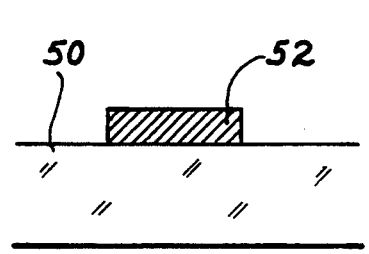
_a_
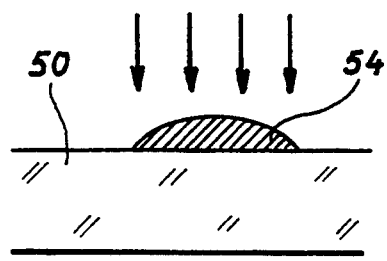
_b_
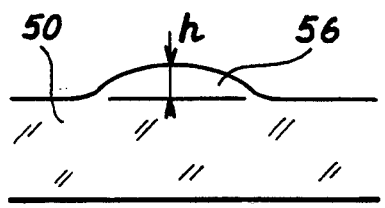
_c_
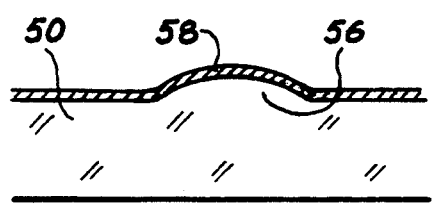
_d_
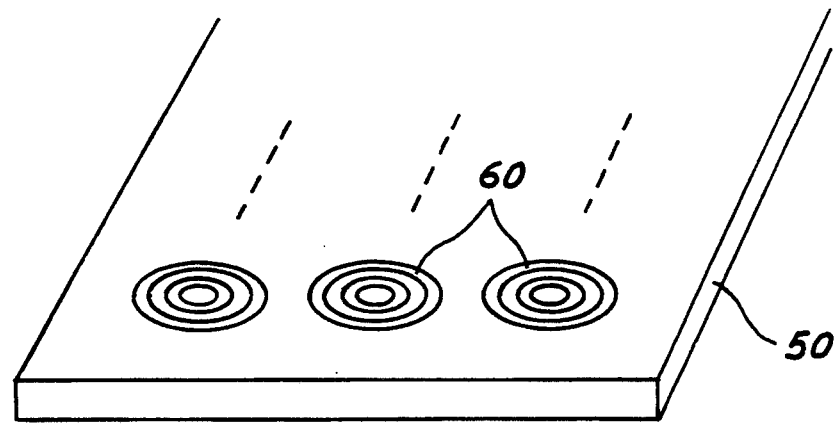
FIG. 10

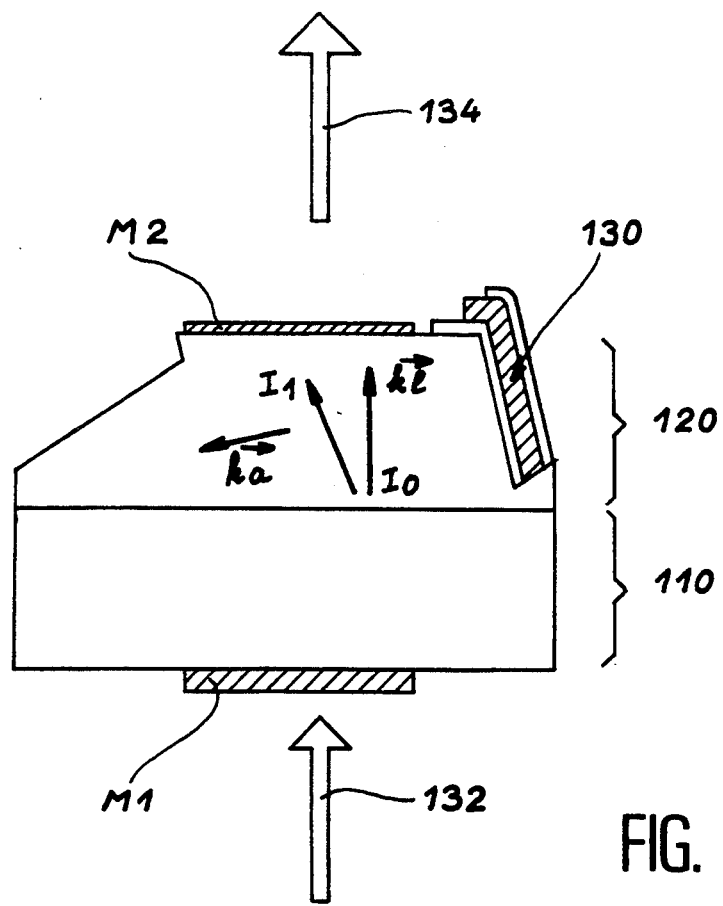
FIG. 14
FIG. 15
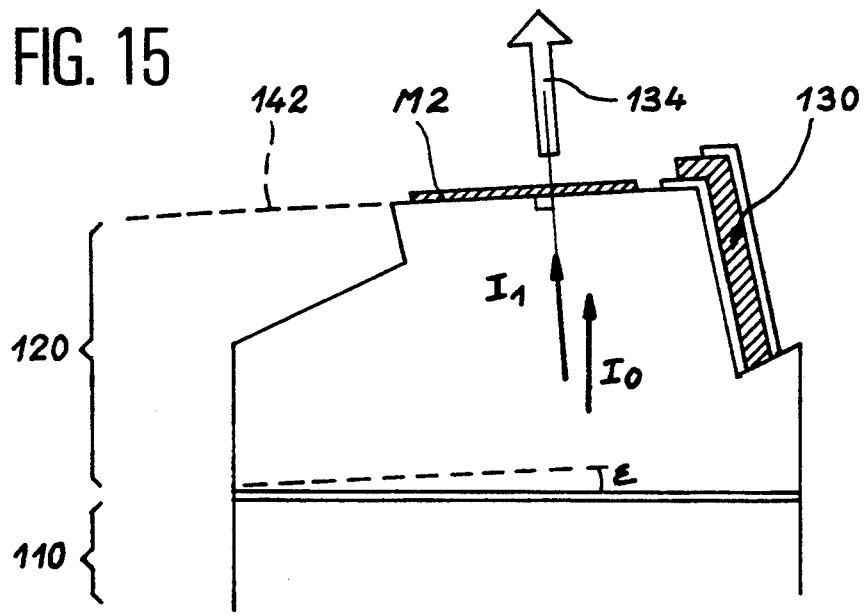

PROCESS FOR THE PRODUCTION OF AN ACOUSTOOPTICAL CELL FOR A SWITCHED LASER, THE CELL OBTAINED, PROCESS FOR THE COLLECTIVE PRODUCTION OF SWITCHED MICROCHIP LASERS AND MICROCHIP LASERS OBTAINED

TECHNICAL FIELD

The present invention relates to a process for the production of an acoustooptical cell for a switched laser, a cell obtained, a process for the collective production of switched microchip lasers and the microchip lasers obtained.

It has applications in optics, physics, optical telecommunications, optical detection (LIDAR), machining of materials, etc.

PRIOR ART

Although the invention is not limited to the production of switched microlasers, it is in this particular context that the invention will be described, because this constitutes a preferred application.

Microchip lasers or microlasers constitute a new family of lasers having numerous advantages. A microchip laser is constituted by an amplifier medium of very limited length (typically 100 μm to a few millimetres) surrounded by two mirrors. This medium is optically pumped by a beam generally coming from a laser diode. The power of said diode generally ranges between about 100 and a few thousand milliwatts.

The efficiency of microchip lasers is approximately 20 to 30%, so that they emit powers of a dozen milliwatts in continuous manner or several hundred milliwatts.

One of the interests of this type of laser is the collective production procedure. Thus, it is sufficient to coat an amplifier material wafer with appropriate reflecting layers and cut microchip lasers from the entity. As it is possible to start with a wafer with a diameter of several centimeters and a single square millimeter of cross-section is sufficient for producing a microchip laser, in a single cycle of technical operations, it is possible to produce several dozen or hundred microchip lasers. Therefore the cost of these components drops to a very low value.

Lasers operating with a continuous pumping bean emit a continuous light bean. However, one of the advantages of solid lasers pumped by laser diodes is that they use amplifier materials, whose radiative life is relatively long (100 μs to 10 ms) compared with the life periods of laser diodes (approximately 1 nanosecond). It is therefore possible to produce switched lasers able to emit very short light pulses (a few nanoseconds to a few dozen nanoseconds) by storing the energy produced by the optical pumping for a period of time approximately the sane as the radiative life of the material and then restoring all said energy during a very short time.

For this purpose it is necessary to have a means preventing the laser effect from occurring, which would dump the stored energy. Such means are known. These can be means able to reduce the overvoltage of the cavity throughout the duration of the storage and reestablish the value of the overvoltage suddenly when it is wished to switch the laser pulse. Reference is then made to switched lasers with switching of the overvoltage factor or which are more commonly known as Q-switched lasers.

In order to produce a switching cell of this type, use can be made of saturable absorbents having electrooptical means or acoustooptical means.

Such means are described to a significant extent in the literature and reference can e.g. be made to the work by W. KOECHNER entitled "Solid-state laser engineering" published by Springer-Verlag and in particular the chapter entitled "Q-switches and external switching devices", pp 402 to 448. Paragraph 8.1.4 entitled "Acoustooptic Q-switches" more specifically describes an acoustooptic cell usable in a continuously pumped Nd-YAG laser. The switching cell can operate in accordance with several modes, namely in so-called RAMAN-NATH diffraction (when the interaction length is short or the acoustic frequency low), or in BRAGG diffraction (in the case of a longer interaction length or a high acoustic frequency).

Another way of obtaining a switched laser is to allow the laser to oscillate normally, but block the output of the light energy and release the latter suddenly deflecting the bean out of the resonator. This operating mode is called "cavity dumping". It is also possible to use acoustooptical means.

The aforementioned document deals with conventional lasers and not microchip lasers. However, switched microchip lasers have recently appeared using electrooptical means. In the report of the CLEO Congress held in the USA in May 1992, J. J. ZAYHOWSKI et al described a switched microchip laser (communication CM17 entitled "Diode-pumped electrooptically Q-switched microchip lasers") constituted by a 532 μm long Nd:YAG microstrip attached to a 904 μm long $LiTaO_3$ microstrip. Electrodes are deposited on the two faces perpendicular to the axis C of the $LiTaO_3$ crystal said axis C being perpendicular to the general axis of the laser. 600 V pulses of duration 100 ns are applied to the electrodes and switched light pulses lasting less than 2 ns are obtained.

The production of switched microchip lasers using electrooptical cells is relatively simple, because there is no particular angular condition to be respected in this phenomenon. The electrooptical effect occurs in the complete volume of the crystal between the electrodes and the interaction with the optical bean traversing the crystal does not lead to a very strict orientation condition between the orientation of the optical bean and that of the electrical field created between the electrodes. Thus, it is sufficient to apply a voltage to the electrodes in order to create an electrical field substantially perpendicular to the light wave vector. This is the case in practice, despite a possibly mediocre crystal surface state. A certain roughness of the faces is even desirable to the extent that it improves the adhesion of the metallic coatings forming the electrodes. In order to produce such microchip lasers, it can be sufficient to merely saw the microstrips of electrooptical material.

This would certainly not be the case with an acoustooptical switching cell because, in this case, strict angular conditions are imposed between the light wave vector and the acoustic wave vector. Moreover, the acoustic wave phase in the acoustooptical material plays a vital part, because it defines the index grating which will create the diffraction phenomenon.

Therefore the face on which is located the acoustic wave generator must have a very high quality and a mere sawing of a crystal block would not be suitable.

Moreover, it is necessary to use for the acoustic wave generator a piezoelectric material and the deposition of such a material, which must have a preferred orientation in order to maintain the piezoelectric properties, requires very precise interface conditions, which would not be compatible with those obtained by even a high quality mechanical sawing.

Thus, satisfactory processes are not known for producing acoustooptical switching cells for microchip lasers.

The object of the present invention is to obviate this deficiency and propose a simple process for producing such a cell. Thus, the solution according to the invention is not limited to the case of microcells for microchip lasers, but is also applicable in the case of acoustooptical switching cells of ordinary dimensions for lasers of ordinary dimensions.

DESCRIPTION OF THE INVENTION

For this purpose, the invention recommends using the anisotropic etching properties, such as that obtained by preferred chemical etching. It is known that this is an etching method based on the etching speed difference between the different cristallographic planes of the same material for certain etching agents. In general, the etching speed is very slow in accordance with one of the crystal planes (the e.g. (111) plane types) and very fast in accordance with the others.

This leads to particular etching geometries resulting from this property and whose shape is imposed by the angular configurations of the slow etching planes and by the initial orientation of the crystals.

This process can be applied to silicon, whose properties are well known in this connection. However, similar configurations can be obtained with germanium or with GaAs or InP or similar semiconductors. In the latter case it is merely necessary to ensure that there are two types of atomic planes.

In order to carry out such an etching over a considerable depth, it is also necessary to have a masking material which is sufficiently resistant to the etching agent.

The present invention makes use of these properties in producing the face on which the acoustic wave production means will be deposited. The high quality of the surface state obtained on such an etched face makes it possible to meet the requirements made by the use of acoustooptical phenomena, as explained hereinbefore.

Although a preferred application of the invention is in the field of microchip lasers, where there are very severe constraints linked with the very small dimensions, it is clear that it is also possible to use the invention for producing acoustooptical switching cells for any switched laser type, such as those described in the aforementioned work by W. KOECHNER. The dimensions of acoustooptical cells are independent of the dimensions of the lasers associated therewith.

The present invention therefore relates to a process for the production of an acoustooptical cell for a switched laser, characterized in that it comprises performing the following operations:

a) starting with an acoustooptical material part transparent to the amplification wavelength of the laser and able to propagate acoustic waves, said material being crystalline and having cristallographic planes, said part having a front face oriented with respect to a selected cristallographic plane, b) depositing on the front face of said part a mask having an edge parallel to the path of the selected cristallographic plane on the front face, c) carrying out anisotropic etching of the part through the mask, said etching giving rise to the appearance, along the edge of the mask, of an etched plane corresponding to the selected cristallographic plane, d) depositing on said etched plane means able to produce an acoustic wave in the material, e) removing the mask.

The present invention also relates to a cell obtained by this process. This cell comprises a block of material transparent to the amplification wavelength of the laser and able to propagate acoustic waves, said block having an etched face, which is a cristallographic plane, a front face and a rear face oriented with respect to said plane and means able to produce an acoustic wave deposited on the etched face.

The present invention also relates to a process in which a plurality of microchip lasers switched by acoustooptical means is obtained, in other words a collective process. According to the invention, this process consists of performing the following operations:

A) producing a first amplifying wafer from a material able to produce an optical amplification at a first wavelength under optical excitation at a second wavelength, said first wafer having a front face and a rear face, B) producing a second acoustooptical wafer by the following operations:

a) the starting product is a wafer made from a material transparent to the first amplification wavelength and able to propagate acoustic waves, said material being crystalline and having cristallographic planes, said second wafer having a front face oriented with respect to a selected cristallographic plane, b) on the front face of the second wafer is deposited a mask formed by an array of patterns, each having at least one edge parallel to the path of the selected cristallographic plane on the front face, c) the second wafer is anisotropically etched through said mask, said etching leading to the appearance between two adjacent patterns and along the said edge of the patterns of an etched plane corresponding to said selected cristallographic plane, d) on each of said etched planes are deposited means able to produce an acoustic wave in the material of the second wafer, e) the mask is removed, C) assembling the first wafer and the second wafer by placing the rear face of the second on the front face of the first, D) forming an array of first micromirrors on the rear face of the first wafer, said micromirrors being reflecting at the first amplification wavelength and at least in part transparent at the second excitation wavelength, E) forming an array of second micromirrors on the front face of the second wafer, said second mirrors being reflecting at the first amplification wavelength, F) cutting the assembly perpendicular to the wafers in order to separate the individual microchip lasers.

It is obvious that these operations can be performed in a random order, in the sense that it is possible to produce the second wafer before the first, or vice versa, or form arrays of mirrors on one or other of the wafers before or after assembly.

In an advantageous variant, the mirrors are formed on a transparent wall and said wall is assembled with one of the wafers. It is possible to produce such walls with two arrays of micromirrors and assemble them on either side of the first and second wafers.

Preferably, in order to obtain a stable resonator, at least one of the micromirrors of each laser is concave. In order to obtain an array of concave micromirrors, it is possible to produce on a transparent wall an array of concave microlenses and cover at least the concave portion of said microlenses with a reflecting coating.

Two similar plates can be produced on this model and then assembled with two wafers prior to the cutting of the assembly.

In all these variants, antireflection coatings can be deposited between the different assembled elements, namely between the first and second wafers and between each wafer and the corresponding micromirror wall.

The present invention finally relates to a switched microchip laser obtained by this process and which is characterized by an acoustooptical switching cell having an etched face.

BRIEF DESCRIPTION OF THE DRAWINGS

FIG. 4 illustrates a straight profile example for a wafer of surface orientation (110).

FIG. 5 shows other oblique profile examples obtainable by anisotropic etching.

FIG. 9 illustrates an embodiment of a micromirror having a microlens.

FIG. 10 illustrates a variant with FRESNEL microlenses.

FIG. 14 illustrates a first operating embodiment of a laser having acoustooptical switching means.

FIG. 15 illustrates a second embodiment of a laser having acoustooptical switching means.

DETAILED DESCRIPTION OF EMBODIMENTS

Figure 1:
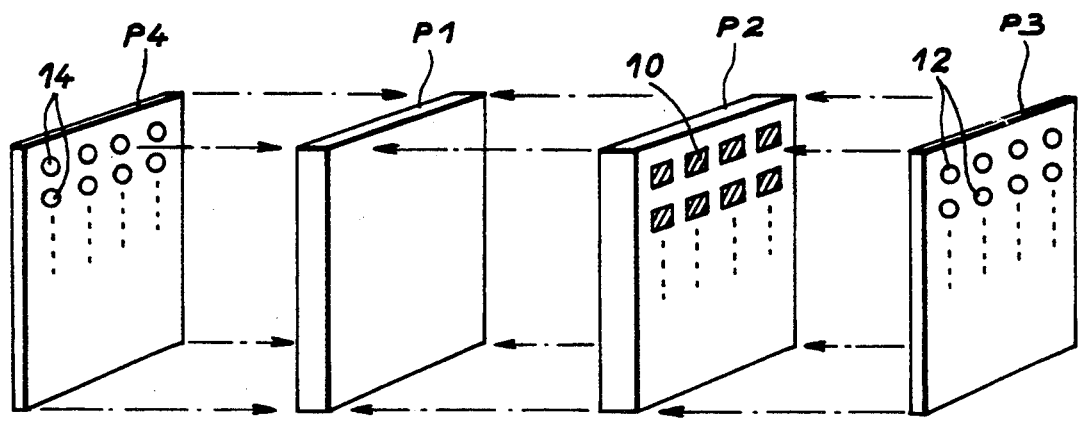
FIG. 1 diagrammatically shows the constitution of an assembly obtained by the process according to the invention in its collective variant.

FIG. 1 shows a first wafer P1 made from a material able to produce an optical amplification under appropriate excitation. The light emitted by P1 presents a wavelength known as the amplification wavelength and which is a function of the doped material $P_1$. This wafer can be made from any known material for such applications, e.g. neodymium or erbium or thullium and/or holmium-doped YAG or neodyme-doped YVO4.

FIG. 1 also shows a second wafer P2 made from an acoustooptical material and coated with a plurality of acoustooptical switching cells 10 obtained in the manner to be explained hereinafter. The second wafer can be of silicon, germanium, gallium arsenide, indium phosphide, etc.

FIG. 1 also shows two walls P3 and P4, each coated with an array of micromirrors, respectively 12 and 14.

In the following description, more particular reference will be made to the process for the production of the second wafer P2 and the walls P3 and P4, knowing that the first wafer P1 is of a conventional nature.

Different embodiments of the wafer P2 are illustrate by FIGS. 2 to 8.

Figure 2:
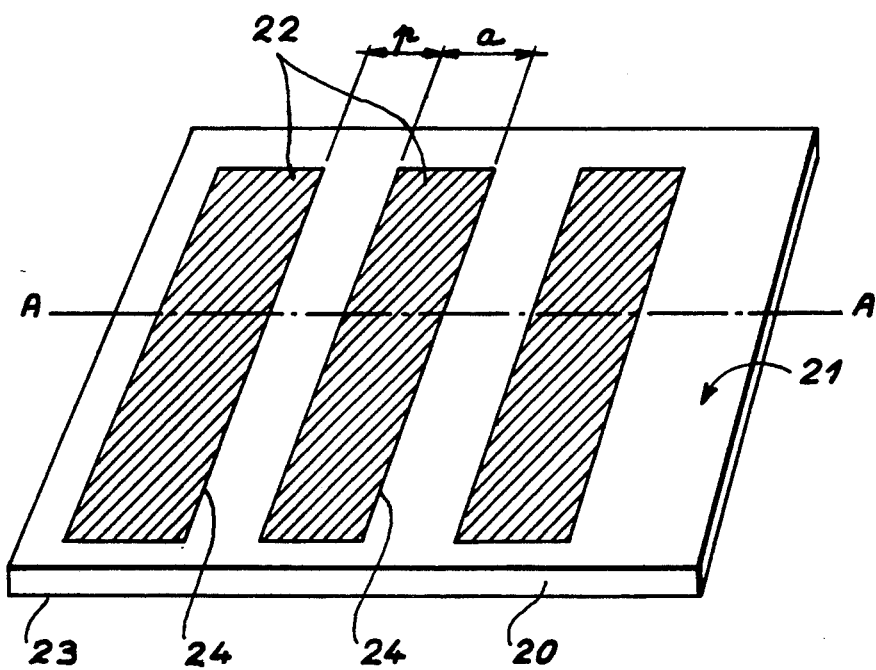
FIG. 2 illustrates a first production stage of an acoustooptical wafer.

FIG. 2 shows a wafer 20 made from appropriately oriented crystalline material having a front face 21 and a rear face 23. This material has cristallographic planes. One of these planes intersects the front face 21 in a certain direction. On the front face 21 is then deposited a mask formed by an array of patterns 22 having at least one edge 24 parallel to the direction according to which the selected cristallographic plane intersects the front face 21. In FIG. 2 these patterns are rectangular strips of width a, separated by a distance p.

Figure 3:
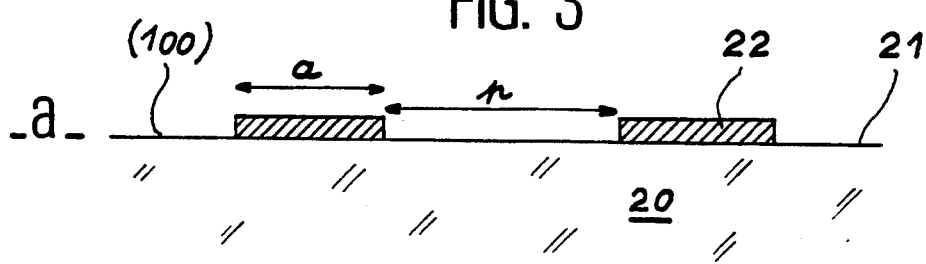
FIG. 3 shows examples of oblique profiles which can be obtained by anisotropic etching on the wafer of surface orientation (100).
Figure 3:
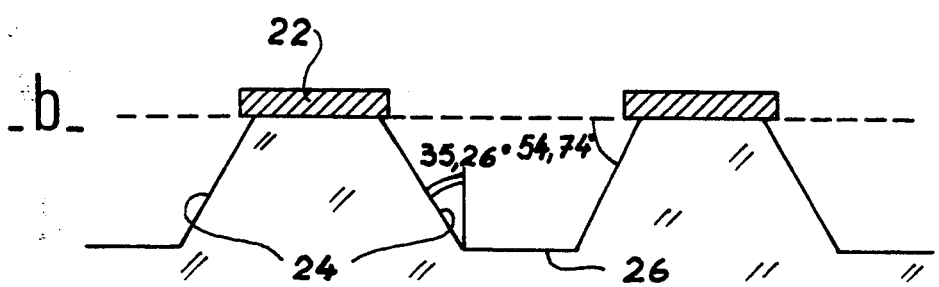
Figure 3:
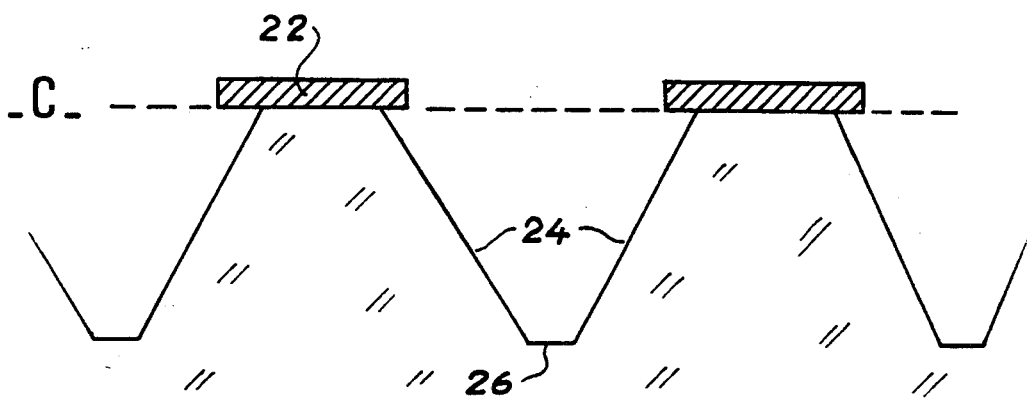
Figure 3:
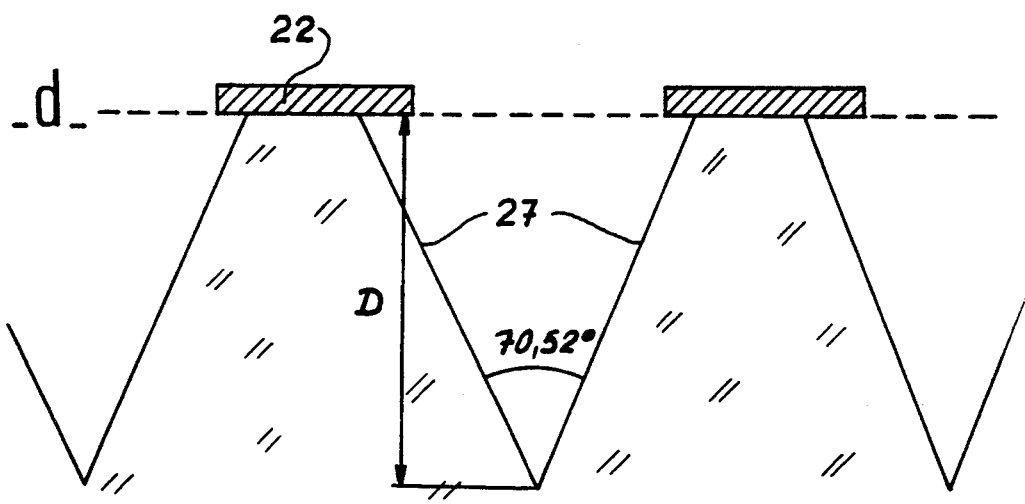

FIG. 3 (a, b, c, d) shows in section several stages in the etching of the wafer 20, in the case where it is made from silicon having a front face 21 oriented in accordance with the cristallographic plane (100). In this case, the mask can e.g. be of silica $SiO_2$ or silicon nitride $Si_3N_4$.

Part (a) of FIG. 3 is a section through the wafer with the mask patterns 22. After a certain etching time (part b), such as a preferred chemical etching e.g. using a mixture of a base and an alcohol (KOH-methanol or the like), the horizontal plane (100) or surface has been etched much more deeply than the planes of type (111). The planes of type (111) are defined by planes (111) and (111), which can be located on either side of the perpendicular to the surface plane. These planes are obliquely oriented and designated 24. The angles between these different planes and the surface plane are 54.74°. The angles of the planes 24 with respect to the perpendicular to the wafer is 35.26°.

After an even longer etching time, the bottom 26 is further reduced size (part c). After a certain time, the bottom has disappeared. The two planes (111) and (111) join and form a V profile 27 forming an angle of 70.52°.

The depth D then evolves slowly, because the etching speed of the planes of type (111) is very slow, but not zero.

Two remarks are made with respect to such a process.
  1) Chemical etching also takes place under the mask 22 and there is a regular shrinkage of the plate defined by the mask, whose initial width is a. At the end of a sufficiently long time, the mask 22 rests on an ever narrower crystal tongue (formation of a mushroom) and can become detached.
  2) The bottom 26 of the etching, which corresponds to a rapid etching of the surface plane, is of poor optical quality and cannot be used as a mirror in the invention. However, the slow etching planes (111)

and (111) are of excellent quality and will be used as a support for piezoelectric means.

FIG. 4 shows a wafer 20, whose front face 20 corresponds to a plane (110). The slow etching planes are planes of type (111). The planes (111) of this type are designated 30 and are perpendicular to the surface plane. The etching bottom is designated 32.

Another particularly interesting case is that of a crystal, whose front face forms an angle $\chi$ with respect to the plane (111). As a function of whether the angle $\chi$ is positive (in the direction of the plane 010) or negative with respect to said plane (010), various etching geometries are obtained, which are respectively illustrated in FIGS. 5 and 6.

a) Case where the angle $\chi$ is positive:
Portion (a) of FIG. 5 shows the formation of slow etching planes 40 (111) and 42 (111). The plane 42 forms an angle $\chi$ with the front face. The inclined faces form an angle of 109.47° (portion b) with the appearance of an underetching 44.

Figure 6:
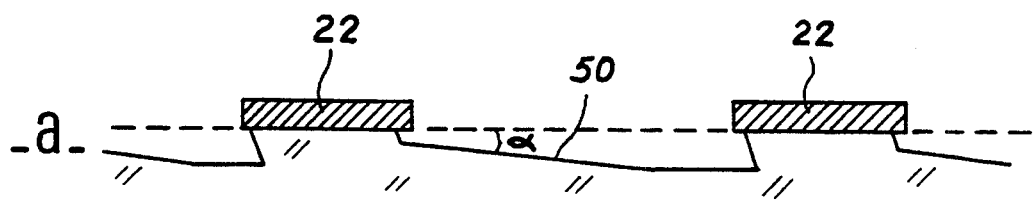
FIG. 6 again shows oblique profile examples obtainable by anisotropic etching.
Figure 6:
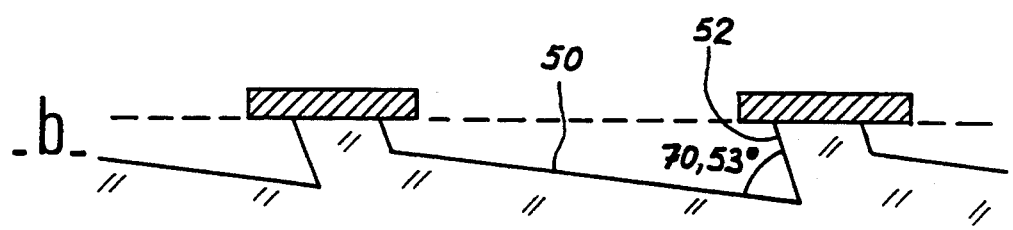
Figure 6:
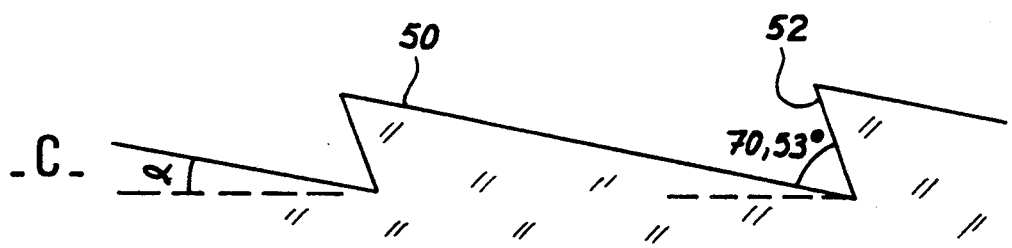

With the mask removed, the profile of portion (c) is obtained with a plate 46. If etching was continued and if the mask was not detached, the geometry of portion (d) would be obtained. However, in practice, etching is stopped prior to the disappearance of the support tongue.

b) Case where the angle $\chi$ is negative:
On this occasion the angle $\chi$ corresponds to a cut from planes of type (111) in the direction opposite to the planes (010), as illustrated in FIG. 6, part a. After a certain etching time, planes 50 (111) and 52 (111) are obtained, which form an angle of 70.53° (part b). In the extreme case sawteeth as in part c would be obtained.

It is clear that the geometry of the etchings obtained is dependent on the angle $\chi$ and the spacing p between the two patterns of the mask and the etching time. If $\chi=0$, the two geometries described hereinbefore relative to FIGS. 5 and 6 become identical and the etching depth is then given by the etching time on the planes of type (111) for which the speed is slower. Thus, it is necessary to have high etching times in order to obtain significant depths.

The geometry of the tongues is dependent on the ratio of the speeds between the slow etching planes of type (111) and the rapidly etched planes.

In known manner, acoustooptical cells operate according to two types of conditions:

BRAGG conditions in which the dimensions of the acoustic beam become large compared with the acoustic wavelength and in which it is possible to define an acoustic wave vector and RAMAN-NATH conditions, in which the acoustic wave is highly diffracted, in other words in which the dimensions of the acoustic beam are small compared with the acoustic wavelength.

This implies that under RAMAN-NATH conditions, it is possible to have a diffraction of the light wave by the acoustic wave without any strict angular condition between the mean propagation direction of the acoustic wave and the propagation direction of the optical wave. However, under BRAGG conditions, interaction can only take place when these two waves form a clearly defined angle $$\frac{\pi}{2} - \theta_B \theta_B$$

being the BRAGG angle.

Thus, in the invention, under RAMAN-NATH conditions, the angle $\chi$ can be of a random nature and in particular zero, whereas under BRAGG conditions, the angle $\chi$ is chosen as a function of the desired angle $\Theta_B$ and is also dependent on the angle $\beta$ between the planes (111) and (111). The relation between $\chi$, $\beta$ and $\Theta_B$ is as follows:

$$\alpha = \frac{\pi}{2} + \theta_B - \beta$$

The angle $\Theta_B$ corresponds to the angle formed by the cristallographic plane on which is deposited the BRAGG cell and the perpendicular to the surface plane. The angle $\Theta_B$ is dependent on the frequency of the acoustic wave. In practice, in order to limit the problems of power dissipation and acoustic wave attenuation, it is preferable to work with frequencies below 1 GHz and therefore with an angle $\Theta_B$ such that $<\Theta_B<10°$. The configuration for which $\beta=70.53°$ (cf. FIG. 1) is consequently the most advantageous.

Figure 7:
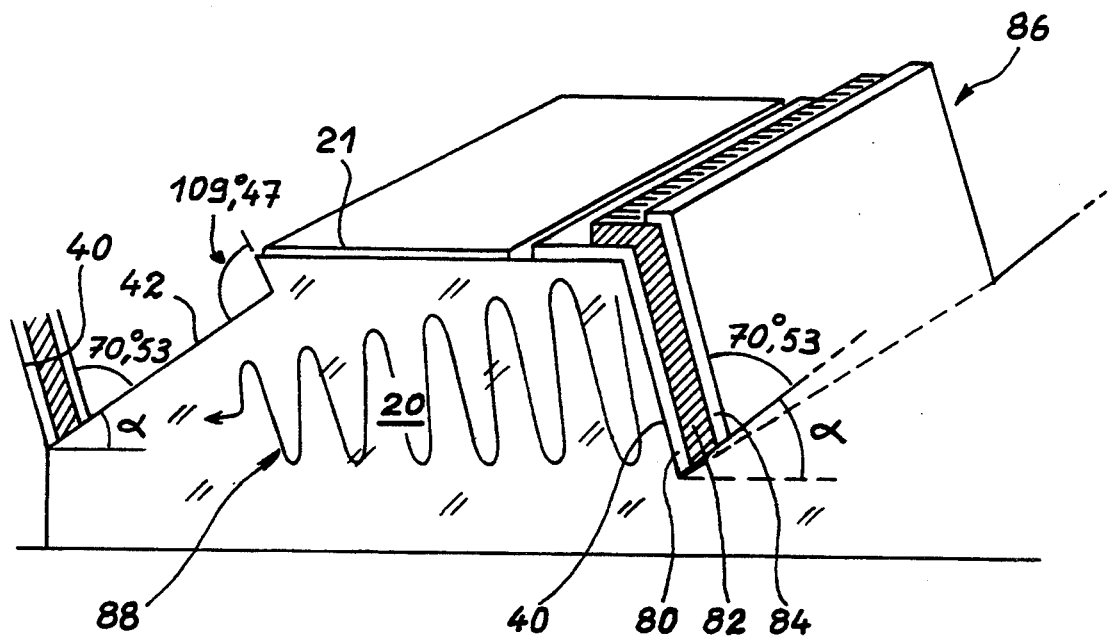
FIG. 7 shows an acoustooptical cell with inclined piezoelectric means.

FIG. 7 shows how it is possible to produce piezoelectric means able to produce an acoustic wave from an etched profile, in the manner explained hereinbefore. The profile shown corresponds to the case illustrated in part c of FIG. 6. An inclined plane 40 is obtained, which forms an angle of 70.53° with the adjacent inclined plane 42, which forms an angle $\alpha$ with the plane parallel to the wafer.

The means deposited on the plane 40 comprise a first electrode 80, a piezoelectric layer 82, as well as a second electrode 84. The assembly 86 of these three layers is able to produce an acoustic wave diagrammatically represented by the reference 88 in the crystalline material. In the illustrated embodiment, said acoustic wave 88 is directed towards the left and slightly downwards, i.e. it is slightly biased. The deposits 80, 82, 84 naturally take place on all the collectively produced etched planes 40, whereas FIG. 1 only shows one of these.

Figure 8:
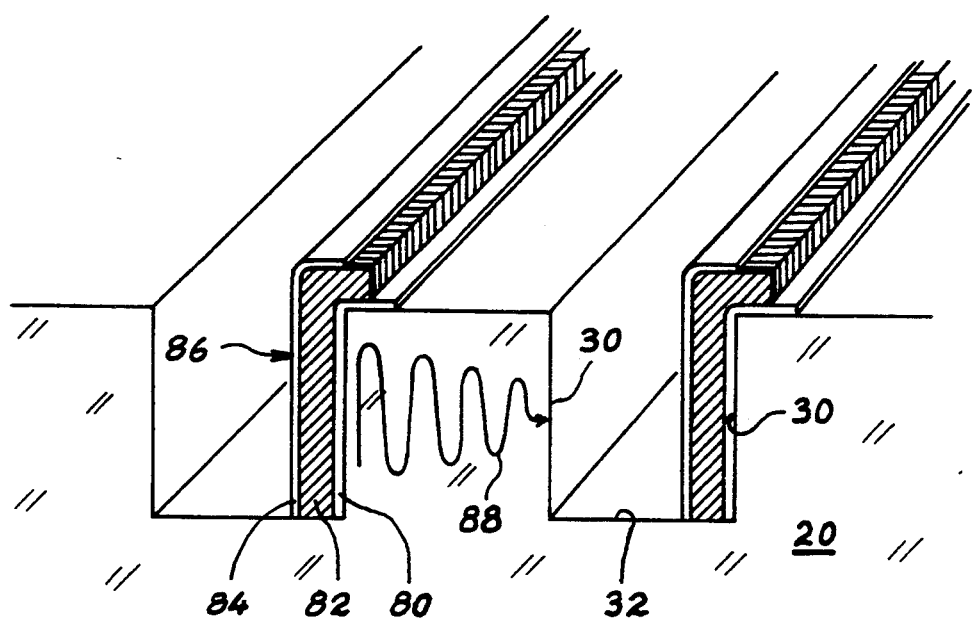
FIG. 8 shows a variant where the piezoelectric means are placed on a face etched at right angles with respect to the surface plane of the wafer.

FIG. 8 shows the same piezoelectric means 86 in the variant where the etching has freed planes 30 perpendicular to the front face of the wafer, said variant corresponding to FIG. 4. It is possible to see the means 86, the first electrode, 80, the piezoelectric layer 82 and the second electrode 84. In this case it is necessary to use a RAMAN-NATH-type diffraction.

In this stage of the production process, it is possible to deposit on the first and second wafers P1 and P2 reflecting layers in order to form the micromirrors of the future microchip lasers. However, it is also possible to form these micromirrors independently of the wafers and then join them to the latter. Preferably, microlenses are formed in order to reduce losses and improve the optical stability. Thus, it is known, that an optical resonator formed by two plane mirrors facing one another is not stable, i.e. the light rays which come and go from one or the other end up by indefinitely moving away from the axis. The stability is obtained by giving at least one of the mirrors a concave curvature. The thus obtained convergence has the effect of bringing the light beams towards the axis. This convergence can also be obtained by using convergent microlenses located at the ends of the resonator. The variants which will now be described apply said stabilization methods.

Firstly, FIG. 9 shows a transparent wall 50, on which is deposited a deformable, photosensitive material layer, etched in the form of studs 52 (part a of FIG. 6). These studs have a random square, circular or elliptical shape. These studs are heated and, by flow or creep, assume the lenticular shape 54 illustrated in part (b).

This is followed by the dry or wet etching of the wall 50 through the masks 54, which leaves behind the microlenses 56 of thickness h (part c). For radii of curvature of 1 to 10 mm and for lens diameters of 100 to 500 μm, the height h is between approximately 0.1 and 30 μm.

These microlenses are covered with a reflecting coating 58 at the amplification wavelength (part d of FIG. 9). This reflecting coating can be etched so as to only cover the concave portion of the lens, or continuously cover the group of lenses.

In another variant illustrated in FIG. 10, the microlenses are PRESNEL microlenses 60 formed on a wall 50 using conventional procedures.

These microlens formation operations can be carried out not only on independent transparent walls such as 50, but also directly on the first and second wafers P1 and P2, if the materials used for forming the latter (amplifying and acoustooptical materials) permit it.

Figure 11:
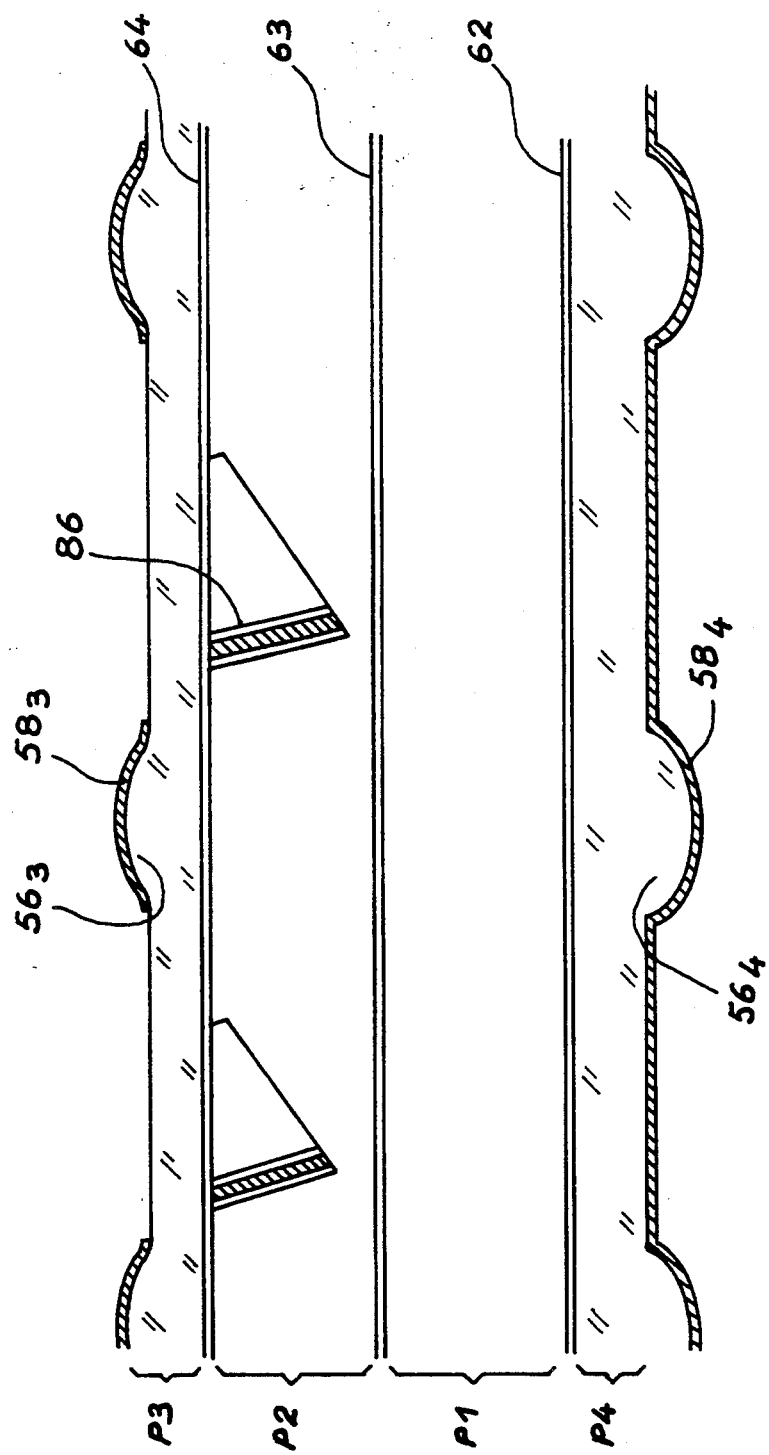
FIG. 11 shows in section the assembled components.

In the case where the microlenses and micromirrors are produced on independent walls which are then joined to the wafers P1 and P2, a structure such as that shown in section in FIG. 11 is finally obtained. It is possible to see the amplifying wafer P1, the acoustooptical wafer P2 and the walls P3 and P4 covered with microlenses $(56)_3$, $(56)_4$ with their mirrors $(58)_3$, $(58)_4$.

Between all these components can be intercalated antireflection coatings 62, 63, 64.

Figure 12:
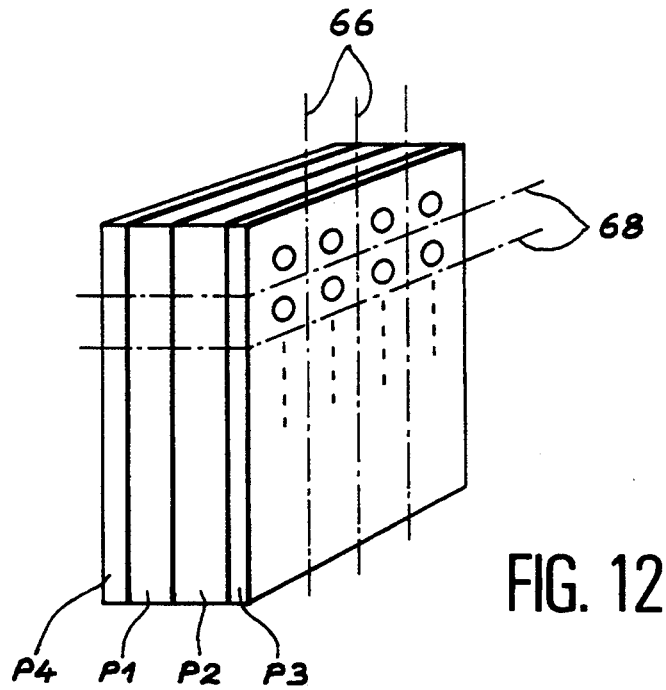
FIG. 12 shows the lines of cut of an assembly.
Figure 13:
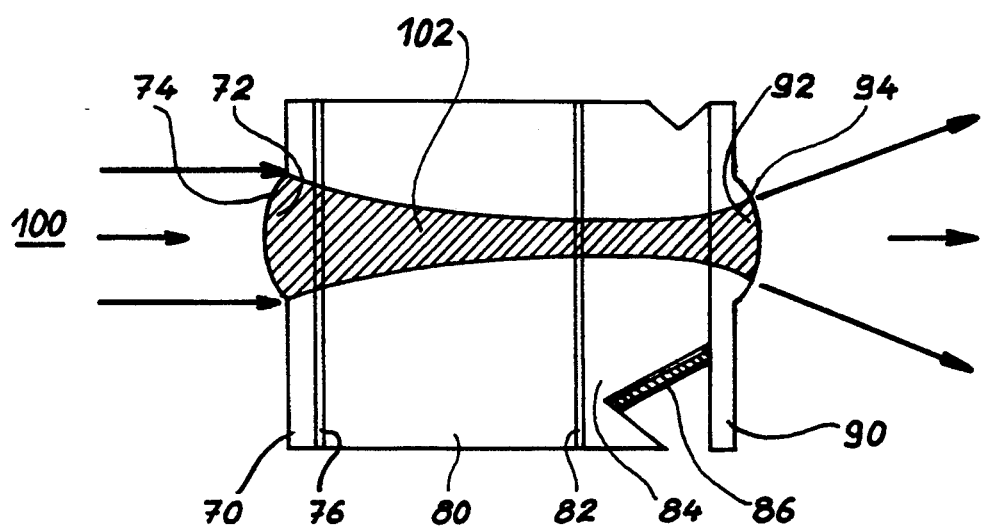
FIG. 13 illustrates an example of a microlaser having acoustooptical switching means obtained according to the invention.

FIG. 12 shows the assembly in perspective with the lines of cut 66 and 68, which reveals the individual microchip lasers. Such a microchip laser is shown in section in FIG. 13. It successively comprises an input wall 70 with an input lens 72 covered with a layer 64 reflecting at the emission wavelength of the microchip laser, but transparent to the excitation wavelength, a first antireflection coating 76, an amplifier block 80, a second antireflection coating 82, an acoustooptical cell 84 with its piezoelectric means 86, an output wall 90 with a microlens 92 and a mirror 94.

The excitation or pumping beam is designated 100 and comes from a not shown source, e.g. a diode. Within the microlaser, between these two mirrors, is established the laser beam 102, with its characteristic widened shape in the vicinity of the mirrors and bent towards the centre and in particular in the area where development takes place of the acoustooptical effect which will produce the switching and permit the formation of the output optical pulse.

The microlasers obtained by this process described hereinbefore can function according to any one of the known switching procedures, namely Q-switching, cavity dumping, etc.

FIG. 14 illustrates the Q-switching operation. In FIG. 14, the microchip laser comprises an amplifier block 110, a switching cell 120 with its piezoelectric means 130 for producing an acoustic wave, two mirrors M1, M2 (diagrammatically shown without their possible curvature), the optical pumping beam being designated 132. Within the resonator and in the absence of an acoustic wave, the light beam has an intensity $I_o$ and a propagation vector $\bar{k}_l$. This beam is then perpendicular to the mirrors M1 and M2.

The excitation of the piezoelectric means 130 gives rise to the appearance of an acoustic wave in the cell 120 with a propagation vector $\bar{k}_a$, which has an angle of $\pi/2-\Theta_B$ with the vector $\bar{k}_l$ under BRAGG operating conditions. This leads to a diffraction of the light wave, which gives rise a diffracted light beam of intensity $I_1$. The propagation vector $\bar{k}_l$ of the light wave therefore switches b a certain angle and is no longer perpendicular to the mirror M2. Therefore the laser oscillation is prevented by the acoustic wave. This can correspond to the energy storage phase on the high level of the laser transition. Switching will then be obtained by eliminating the acoustic wave. The switched beam is designated 134.

In FIG. 15 (still in the Q-switching operating mode), the microchip laser shown is obtained from a second wafer, whose rear face 142 was not parallel to the front face 142 and instead formed an angle ε. This angle is chosen in such a way that, in the presence of acoustic waves, the diffracted light beam of intensity $I_1$ is perpendicular to the mirror M2. The angle ε is generally between 0° and 5°. Thus, unlike in the preceding case, the energy storage period then occurs in the absence of an acoustic wave and switching is obtained by controlling the piezoelectric means 130.

Figure 16:
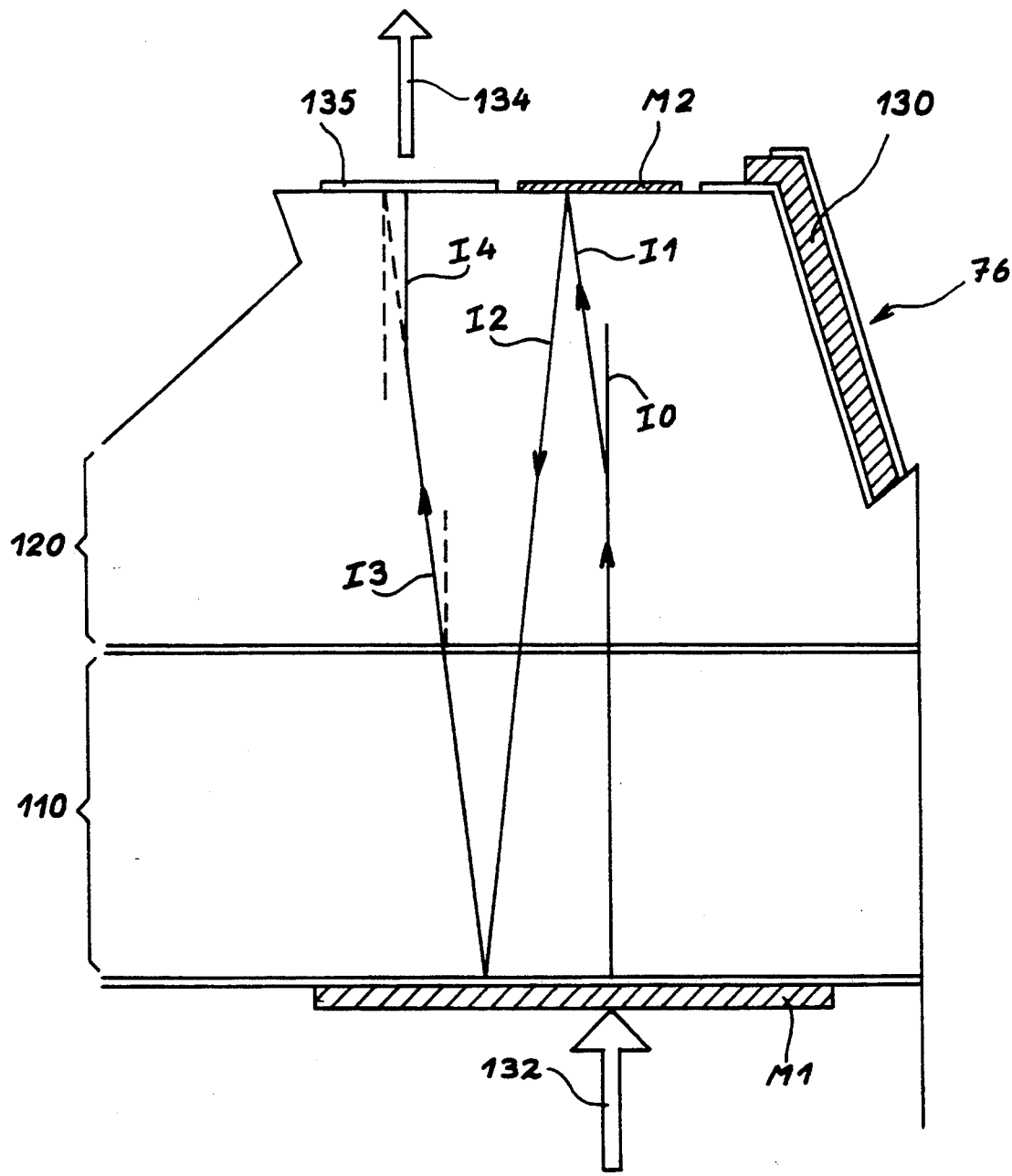
FIG. 16 illustrates an operating mode of the cavity dumping type.

In the variant of FIG. 16 and in the absence of acoustic waves, the laser oscillates, but the energy is confined within the resonator formed by the two mirrors M1 and M2 (optionally associated with not shown lenses), which are both highly reflecting. In the presence of an acoustic wave, the light beam is deflected $I_1$ and, after one or more reflections $I_2$ and strikes the front face of the microchip laser in an area alongside the mirror M2. Therefore the light beam can escape from the cavity. The escape will be even better if an antireflection coating 135 is placed alongside the mirror M2. Therefore this operating mode corresponds to the cavity dumping mode. This case is more particularly usable for laser cavity lengths (amplifying medium) of large size leading to a long life of the photons in the cavity.

The switched operation of the microchip lasers obtained according to the process of the invention is essentially based on the acoustooptical cell. In order to appropriate choose the material from which said cell is to be made, use can be made of the following considerations.

Consideration will only be given to the case of volume waves produced by an electrode of length L and of width H. If L and H are large compared with the acoustic wavelength $\lambda_a$, it can be considered that the diffraction of the acoustic wave is negligible and that said wave propagates along a parallelepiped of section LH. For simplification purposes, consideration will only be given to particular propagation directions of the acoustic and optical waves.

Conventionally definition takes place of several coefficients or parameters able to describe the operation of an acoustooptical material. It is firstly possible to define a merit coefficient, designated $m_2$, which represents the capacity of the acoustooptical material to diffract the light for a given acoustic power. It is therefore directly linked with the index variation produced in the considered interaction directions.

The coefficient $m_2$ is given by a relation of form $$m_2 = \frac{n^6 p^2}{\rho v_a^2}$$

in which n is the index, p an acoustooptical coefficient, ρ the density of the material and $v_a$ the acoustic speed.

Thus, it is possible to calculate the index variation $\Delta n$ obtained in the acoustooptical material, so as to give $$\Delta n = \sqrt{\frac{Pa}{2} \, m_2 \frac{1}{LH}}$$

in which Pa is the acoustic power.

It is finally possible to define a third parameter $\xi$, which defines the force of the acoustooptical interaction:

$$\xi = -\frac{k_o}{\cos\theta_o} \sqrt{m_2} \sqrt{\frac{PaL}{2H}}$$

in which $\Theta_o$ is the angle formed by the direction of the lightwave with the perpendicular to the acoustic wave direction and in which $$k_o = \frac{2\pi}{\lambda_o}$$

is the amplitude of the light wave vector.

These relations will be used with an acoustic power Pa of 1 Watt in order to standardize the results.

For $m_2$ will be used the values given in the literature for a given material and a given configuration (i.e. acoustic wave direction, optical wave direction, type of excited acoustic waves, etc.).

The parameter $\xi$ determines the intensity of the diffracted beam as a function of the operating conditions used. Under RAMAN-NATH conditions, we have $I_q = J^2_q (\xi)$, in which q is the diffraction order and $J_q$ the order q BESSEL function. Under BRAGG conditions, we have $I_1 = \sin^2 (\xi/2)$.

Thus, use is subsequently made of materials complying with the following characteristics:
- the material must be machinable over considerable thicknesses (several hundred microns) with convenient methods ensuring an excellent surface quality, which is in particular the case with anisotropic etching methods;
- these materials must have low acoustic losses at high frequency (50 dB/(cmGHz$^2$) appearing to be an upper limit, which corresponds to approximately 1 dB of losses on 1 mm of propagation at 500 MHz, which is of the order of magnitude of the acoustic frequencies used;
- the transparency must be suitable for microlaser emission wavelengths, ideally a transparency beyond 0.9 to 1 mm of wavelength being sought, but for many applications about 1.5 μm and between 2 and 3 μm are the aim.

Materials fulfilling these conditions are in particular silicon Si, germanium Ge, gallium arsenide GaAs, indium phosphide InP and gallium phosphide GaP. They are all available with an appropriate surface and quality and can be chemically machined with known etching solutions and with etching speeds highly dependent on the crystalline planes. The acoustic characteristics of these materials are summarized in table 1.

In this table, the calculation conditions for the coefficient $m_2$ are given by acoustic wave types. The acoustic wave is assumed to be longitudinal (L) with respect to certain cristallographic planes given in brackets.

TABLE 1

| Materials | Transparency range (μm) | Wavelength (μm) | Acoustic wave | Speed m/s | Acoustic losses dB/cm.GHz$_2$ | Density kg/m$^3$ | Refractive index | $m_2$ $10^{-15}$s$^3$kg$^{-1}$ |
|---|---|---|---|---|---|---|---|---|
| Si | 1.2–11 | 10.6 | L-[111] | 9850 | 6.5 | 2330 | 3.42 | 6.2 |
| GaP | 0.6–10 | 0.633 | L-[110] | 6320 | 6 | 4130 | 3.31 | 44.6 |
| Ge | 2–20 | 10.6 | L-[111] | 5500 | 30 | 5330 | 4.00 | 840 |
| GaAs | 0.9–11 | 1.15 | L-[110] | 5150 | 30 | 5340 | 3.37 | 104 |
| InP | 1–10 μm | 1.15 | L-[110] | 5120 | 30 | 5340 | 3.37 | 100 |

Table II gives the results of index variations $\Delta_n$ as a function of the interaction length L for a given acoustic power Pa (equal to 1 W) and for a given height H (equal to 1000 μm) for the three materials silicon, germanium and gallium arsenide.

TABLE II

| | | L = 100 μm | L = 500 μm | L = 1000 μm |
|---|---|---|---|---|
| Si | n | $1.8 \cdot 10^{-4}$ | $8 \cdot 10^{-15}$ | $5.6 \cdot 10^{-5}$ |
| $m_2 =$ 6.2 · $10^{15}$s$^3$kg$^{-1}$ | nL | $1.8 \cdot 10^{-8}$m$^{-1}$ | $4 \cdot 10^{-8}$m$^{-1}$ | $5.6 \cdot 10^{-8}$m$^{-1}$ |
| Ge | n | $2 \cdot 10^{-3}$ | $9 \cdot 10^{-4}$ | $6.5 \cdot 10^{-4}$ |
| $m_2 =$ 840 · $10^{-15}$s$^3$kg$^{-1}$ | nL | $2 \cdot 10^{-7}$m$^{-1}$ | $4.5 \cdot 10^{-7}$m$^{-1}$ | $6.5 \cdot 10^{-7}$m$^{-1}$ |
| GaAs | n | $0.7 \cdot 10^{-3}$ | $3.2 \cdot 10^{-4}$ | $2.3 \cdot 10^{-4}$ |
| $m_2 =$ 104 · $10^{-15}$s$^3$kg$^{-1}$ | nL | $0.7 \cdot 10^{-7}$m$^{-1}$ | $1.6 \cdot 10^{-7}$m$^{-1}$ | $2.3 \cdot 10^{-7}$m$^{-1}$ |

Taking $\cos\Theta_o = 1$, $\lambda_o = 2$ μm, we obtain $k_o = 3.14$ and the values for $\xi$ for the three materials in question (for a power Pa of 1 W and a height H of 1000 μm) are given in table III.

TABLE III

| | L = 100 μm | L = 500 μm | L = 1000 μm |
|---|---|---|---|
| Si | $5.65 \cdot 10^{-2}$ | $12.5 \cdot 10^{-2}$ | $17.6 \cdot 10^{-2}$ |
| Ge | 0.63 | 1.4 | 2 |
| GaAs | 0.22 | 0.50 | 0.72 |

If is small, the diffracted order 1 intensity is equivalent in BRAGG conditions and RAMAN-NATH conditions:

$$I_1 = J_1^2 (\xi) \approx \frac{\xi^2}{4} \text{ in RAMAN-NATH,}$$

$$I_1 = \sin^2 \frac{\xi}{2} \approx \frac{\xi^2}{4} \text{ in BRAGG.}$$

It can be seen that germanium and gallium arsenide can function in both types of conditions, as a function of the chosen operating procedure, because the diffractive intensities remain high, even with small interaction widths.

However, silicon will cause certain problems and can only be used for inducing supplementary losses in the cavity and for permitting a Q-switch-based operation. Cavity dumping operations, which assumes all the energy in the diffracted order, will require high material thicknesses or control powers.

Table IV gives the ratio $$\frac{I_1}{I_0}$$

of the diffracted order 1 and the non-diffracted order 0 intensities.

TABLE IV

| | L = 100 μm | L = 500 μm | L = 1000 μm |
|---|---|---|---|
| Si | $8 \cdot 10^{-5}$ | $3.9 \cdot 10^{-3}$ | $7.7 \cdot 10^{-2}$ |
| Ge | 0.1 | 0.30 (RAMAN-NATH) RN | 0.33 |
| | | 0.42 (BRAGG) B | 0.71 |
| GaAs | $1.2 \cdot 10^{-2}$ | $6.25 \cdot 10^{-2}$ | 0.12 |
| | | | 0.124 |

I claim:

1. A process for the production of an acoustooptical cell for a switched laser, characterized in that it comprises performing the following operations:
   a) starting with an acoustooptical material part (20) transparent to the amplification wavelength of the laser and able to propagate acoustic waves, said material being crystalline and having crystallographic planes, said part having a front face (21) oriented with respect to a selected crystallographic plane,
   b) depositing on the front face (21) of said part a mask (22) having an edge (24) parallel to the path of the selected crystallographic plane on the front face (21),
   c) carrying out anisotropic etching of the part through the mask (22), said etching giving rise to the appearance, along the edge of the mask, of an etched plane (24, 30, 42) corresponding to the selected crystallographic plane,
   d) depositing on said etched plane (24, 30, 42) means able to produce an acoustic wave (88) in the material,
   e) removing the mask.

2. A process according to claim 1, characterized in that the crystallographic plane chosen for forming the etched plane forms an acute angle with the direction perpendicular to the front face of the acoustooptical material part.

3. A process according to claim 1, characterized in that the crystallographic plane chosen for forming the etched plane is perpendicular to the front face of the acoustooptical material part.

4. A process according to claim 2 or 3, characterized in that the crystallographic plane chosen for the etched plane is of type (111).

5. A process according to claim 1, characterized in that an acoustooptical material part is produced having a rear face forming an acute angle with the front face.

6. A process according to claim 1, characterized in that for producing on the etched plane the acoustic wave excitation means (86), a first electrode (80) is deposited on the etched plane (40), followed by a piezoelectric material layer (82) and then a second electrode (84) is deposited on the piezoelectric material layer.

7. A process according to claim 1, characterized in that a microcell is produced for a switched microchip laser.

8. An acoustooptical cell for a switched laser obtained by the process according to any one of the claims 5 to 7, characterized in that it comprises a material block transparent to the amplification wavelength of the laser and able to propagate acoustic waves, said block having an etched face (24, 30, 40), which is a crystallographic plane, a front face (21) and a rear face (23) oriented with respect to said plane and means (86) able to produce an acoustic wave (88) deposited on the etched face (24, 30, 40).

9. A process for the collective production of microchip lasers having acoustooptical switching means, characterized in that it consists of carrying out the following operations in a random order:
   A) producing a first amplifying wafer (P1) from a material able to produce an optical amplification at a first wavelength under optical excitation at a second wavelength, said first wafer having a front face and a rear face,
   B) producing a second acoustooptical wafer (P2) by the following operations:
      a) the starting product is a wafer (20) made from a material transparent to the first amplification wavelength and able to propagate acoustic waves, said material being crystalline and having crystallographic planes, said second wafer having a front face (21) oriented with respect to a selected crystallographic plane,
      b) on the front face (21) of the second wafer is deposited a mask (22) formed by an array of patterns, each having at least one edge (24) parallel to the path of the selected crystallographic plane on the front face (21),
      c) the second wafer is anisotropically etched through said mask (22), said etching leading to the appearance between two adjacent patterns and along the said edge of the patterns of an etched plane corresponding to said selected crystallographic plane,
      d) on each of said etched planes (24, 30, 40) are deposited means (86) able to produce an acoustic wave in the material of the second wafer,
      e) the mask (22) is removed,
   C) assembling the first wafer (P1) and the second wafer (P2) by placing the rear face of the second on the front face of the first,
   D) forming an array of first micromirrors ($58_4$) on the rear face of the first wafer, said micromirrors being reflected at the first amplification wavelength and at least in part transparent at the second excitation wavelength,
   E) forming an array of second micromirrors ($58_3$) on the front face of the second wafer, said second mirrors being reflecting at the first amplification wavelength,
   F) cutting the assembly perpendicular to the wafers in order to separate the individual microchip lasers.

10. A process according to claim 9, characterized in that the crystallographic plane chosen for forming the etched plane forms an acute angle with the direction perpendicular to the front face of the second wafer.

11. A process according to claim 9 or 10, characterized in that the crystallographic plane chosen for the etched planes is of type (111).

12. A process according to claim 9, characterized in that the crystallographic plane chosen for forming the etched planes is perpendicular to the front face of the second wafer.

13. A process according to claim 9, characterized in that a second wafer is produced with a rear face forming an acute angle with the front face.

14. A process according to claim 9, characterized in that for producing on etched planes the means (86) for exciting an acoustic wave, a first electrode (80) is deposited on each etched plane (40), followed by the deposition of a piezoelectric material layer (82) and then a second electrode (84) is deposited on the piezoelectric material layer (82).

15. A process according to claim 9, characterized in that, during the assembly of the wafers, between the first and second wafers is intercalated an antireflection coating (63).

16. A process according to claim 9, characterized in that, for forming an array of micromirrors on one of the wafers, a transparent wall (50) is formed, on one of the faces of said wall is formed an array of micromirrors (58) and the wall (50) with its array of micromirrors is joined to the wafer.

17. A process according to claim 9, characterized in that each micromirror (58) of the array of first micromirrors and/or the array of the second micromirrors is concave.

18. A process according to claim 16, characterized in that the production of the array of micromirrors consists of coating the wall with an array of microlenses (56) and covering said microlenses with a coating (58) reflecting at the first amplification wavelength.

19. A process according to claim 16, characterized in that the production of the array of micromirrors consists of depositing on the wall (50) an array of FRESNEL microlenses (60) and covering said lenses with a coating reflecting at the first amplification wavelength.

20. A switched microchip laser obtained by the process according to any one of the claims 12 to 19, characterized in that it comprises an amplifier microstrip (80) assembled with an acoustooptical switching microcell (82), said microcell having an etched face (40) covered with means (86) able to produce an acoustic wave, two micromirrors (74, 94) surrounding the microstrip-microcell assembly (80, 84).

* * * * *